United States Patent
Mueller et al.

[11] Patent Number: 6,141,854
[45] Date of Patent: *Nov. 7, 2000

[54] BELT-LINE WINDOW MOLDING

[75] Inventors: Roland Mueller, Caledon East; Urs Binder, Newmarket, both of Canada

[73] Assignee: Decoma International Inc., Ontario, Canada

[*] Notice: This patent issued on a continued prosecution application filed under 37 CFR 1.53(d), and is subject to the twenty year patent term provisions of 35 U.S.C. 154(a)(2).

[21] Appl. No.: 08/889,066

[22] Filed: Jul. 7, 1997

Related U.S. Application Data

[60] Provisional application No. 60/021,409, Jul. 9, 1996.

[51] Int. Cl.$^7$ .................................................. B23P 11/02
[52] U.S. Cl. ................................................ 29/450; 29/453
[58] Field of Search ................... 29/453, 450; 49/475.1, 49/482.1, 490.1, 493.1

[56] References Cited

U.S. PATENT DOCUMENTS

| | | | |
|---|---|---|---|
| 2,153,380 | 4/1939 | Lyon | 29/453 X |
| 2,612,972 | 10/1952 | Heimgartner et al. | |
| 2,647,289 | 8/1953 | Harbert | |
| 2,856,229 | 10/1958 | Adell | 29/453 X |
| 3,110,068 | 11/1963 | Perrochat | 29/453 |
| 3,742,649 | 7/1973 | Dochnahl | |
| 4,278,286 | 7/1981 | Kiba et al. | |
| 4,291,076 | 9/1981 | Katoh | |
| 4,758,039 | 7/1988 | Ohhazama et al. | |
| 4,766,662 | 8/1988 | Bradshaw et al. | 29/453 X |
| 5,125,185 | 6/1992 | Shiota et al. | |
| 5,137,323 | 8/1992 | Gross et al. | |
| 5,493,814 | 2/1996 | Christian | |
| 5,540,477 | 7/1996 | Mori | |
| 5,561,003 | 10/1996 | Nowosadly | |

FOREIGN PATENT DOCUMENTS

| | | |
|---|---|---|
| 1 087 464 | 2/1955 | France . |
| 2 089 437 | 1/1972 | France . |
| 22 28 061 | 12/1973 | Germany . |
| 4-244424 | 9/1992 | Japan ...................................... 49/475.1 |
| 1 514 017 | 6/1978 | United Kingdom . |
| 2 075 101 | 11/1981 | United Kingdom . |

*Primary Examiner*—Irene Cuda
*Attorney, Agent, or Firm*—Pillsbury Madison & Sutro LLP

[57] ABSTRACT

A method of assembling a belt-line window molding for a motor vehicle door comprising i) a main body including a resilient window sealing structure constructed and arranged to seal a gap between the motor vehicle door and the motor vehicle window, and a mounting structure constructed and arranged to mount the window molding on the motor vehicle door, the mounting structure including a rigid portion, and ii) a metal cover member having a channel configuration constructed and arranged to cover a portion of the mounting structure which is adapted to extend in overlying relation to an exterior surface of the door. The method comprises forming the main body by extrusion; placing one edge of the metal cover member in an edge receiving recess of the main body; pivoting the metal cover member generally about the one edge so as to cause an opposite edge of the metal cover member to engage the rigid portion of the mounting structure; forcing the opposite edge of the metal cover member to move in sliding engagement across the rigid portion; outwardly flexing the channel configuration of the metal cover member as a result of the cover member being forced to move in sliding engagement across the rigid portion; and inwardly flexing the cover member back towards its original configuration and into gripping engagement with the rigid portion to secure the cover member to the main body.

8 Claims, 3 Drawing Sheets

BELT-LINE WINDOW MOLDING

This application claims priority from provisional application Ser. No. 60/021,409, filed Jul. 9, 1996.

BACKGROUND OF THE INVENTION

The present invention relates to window moldings, and in particular, window moldings for a motor vehicle which are constructed and arranged to seal the interface between an automobile window glass and an adjacent body structure.

Conventionally, automobiles are provided with elongate window moldings which are constructed and arranged to form a seal between window glass and the surrounding or adjacent body structure on which the glass is mounted. Typically, the window molding is fixed to the vehicle body structure and provides a sealing engagement with the periphery of the window glass to prevent water and other environmental elements from passing between the body structure and the window glass.

Because window moldings have a main body which is usually not particularly aesthetically appealing, the main body is covered with a more appealing cover member. The cover member may be painted, anodized, chrome-plated, or otherwise treated.

Conventionally, the cover member has been secured to the main body portion of the window molding in a variety of different methods. In one conventional method, the cover member is extruded directly onto the main body portion generally towards the end of the manufacturing process. Typically, the body portion itself, which normally comprises a rubber or resilient material, and in some cases, an accompanying rigid structure or rigid insert, is itself extruded. By forming the cover member as an extrusion over the extruded main body portion, the manufacturer must designate the particular configuration, construction, and appearance of the cover member at the same time at which the main body portion is being completed. This method renders it rather impractical for the manufacturer to manufacture a large number of main body portions, and then later decide the type, shape, etc. of cover member to be applied to the main body portion. As a result, manufacturing flexibility is impaired, and the cost-savings associated with manufacturing a large number of body portions at one time is not realized.

In an alternate manufacturing process, the body portion is extruded such that it is configured to have a pair of longitudinal grooves which are constructed and arranged to receive the edges of a channel-like cover member by sliding such edges along the grooves in a longitudinal fashion. This is a rather laborious and tedious task, especially where a degree of curvature is to be provided in the window molding.

In yet other arrangements, the cover member is secured to the main body portion by various types of separate clip-members or attachment-members which form the connecting interface between the cover member and main body portion. These clip members are inconvenient in the manufacturing process and add to the total cost of the molding. In yet other arrangements, the molding is glued with an adhesive to the main body portion. This adds costs and complexity to the manufacturing process.

It is an object of the present invention to overcome the shortcomings noted above. In accordance with this object, the present invention provides a method of assembling a belt-line window molding for a motor vehicle door comprising i) a main body including a resilient window sealing structure constructed and arranged to seal a gap between the motor vehicle door and the motor vehicle window, and a mounting structure constructed and arranged to mount the window molding on the motor vehicle door, the mounting structure including a rigid portion, and ii) a metal cover member having a channel configuration constructed and arranged to cover a portion of the mounting structure which is adapted to extend in overlying relation to an exterior surface of the door. The method comprises forming the main body by extrusion; placing one edge of the metal cover member in an edge receiving recess of the main body; pivoting the metal cover member generally about the one edge so as to cause an opposite edge of the metal cover member to engage the rigid portion of the mounting structure; forcing the opposite edge of the metal cover member to move in sliding engagement across the rigid portion; outwardly flexing the channel configuration of the metal cover member as a result of the cover member being forced to move in sliding engagement across the rigid portion; and inwardly flexing the cover member back towards its original configuration and into gripping engagement with the rigid portion to secure the cover member to the main body.

It is preferred that the metal cover member be secured to the main body before the window molding is mounted on the motor vehicle. It is also preferred that the cover member be treated (e.g., anodized, chrome plated, painted) after the main body is formed by extrusion.

It is a further object of the invention to provide a belt line window molding for a motor vehicle comprising a main body including a window sealing structure and a mounting structure, the sealing structure formed from a resilient material constructed and arranged to seal a gap between a motor vehicle door and a motor vehicle window, and the mounting structure constructed and arranged to mount the window molding on the motor vehicle door, the mounting structure including a rigid portion having a ridge formed thereon; a metal cover member having a channel configuration including a pair of opposite edges, the main body having an edge receiving recess being constructed and arranged to enable one edge of the edges to be received therein; the edge receiving recess being cooperable with the one edge to enable the cover member to be pivoted generally about the one edge to enable an opposite edge of the edges to engage the rigid portion of the mounting structure and ride upward and over the ridge formed on the rigid portion, the metal cover member flexing outwardly as it rides upward the ridge, and then flexing inwardly after it rides over the ridge, and the metal cover member thus being retained in secure engagement with the main body.

Further objects and advantages of the present invention will be appreciated from the following detailed description, drawings and claims.

DETAILED DESCRIPTION OF THE DRAWINGS

Figure 1:
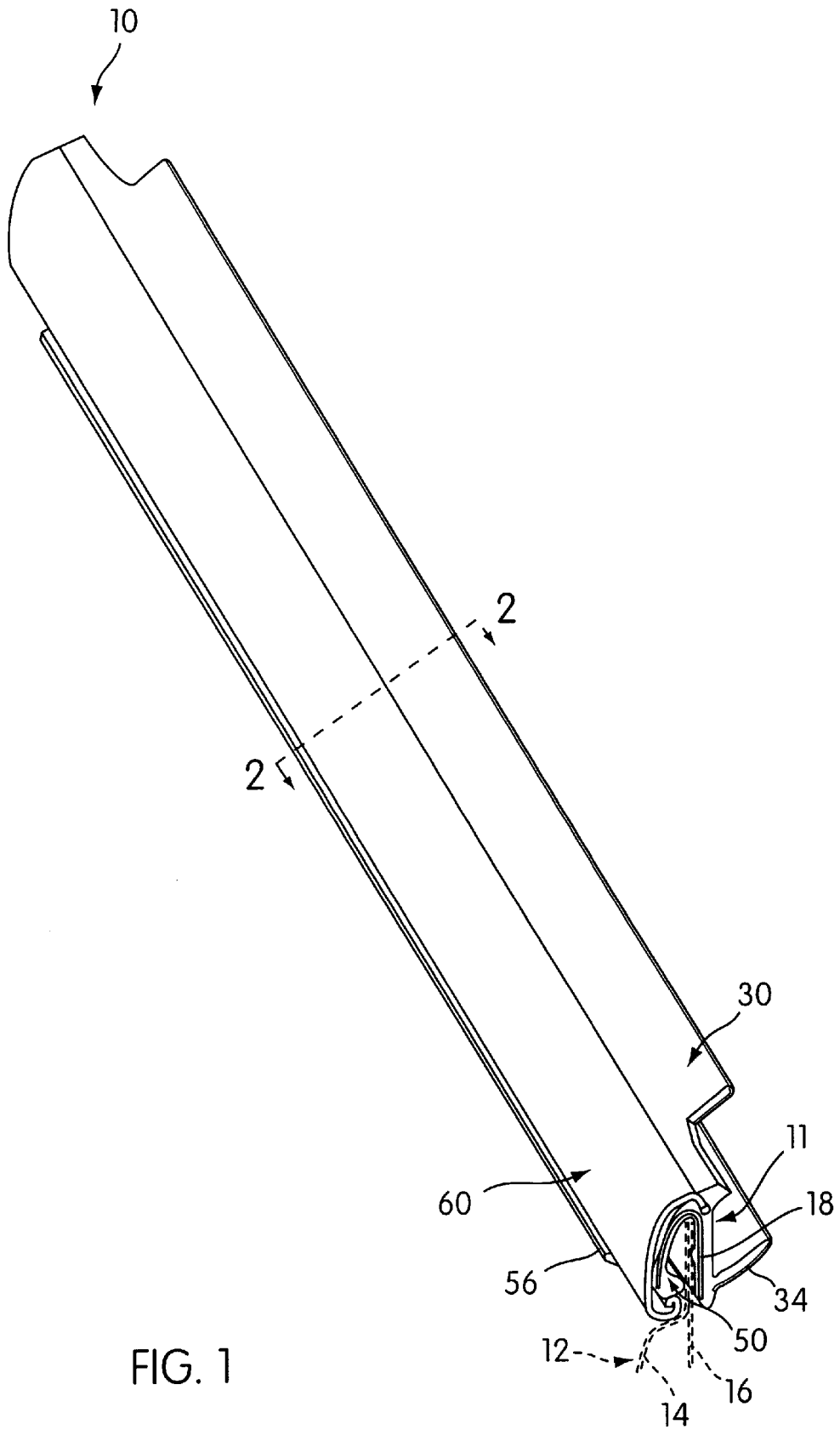
FIG. 1 is a perspective view of a belt-line window molding shown installed on a vehicle door in accordance with the principles of the present invention.

Shown generally in FIG. 1 is a belt-line window molding 10 manufactured in accordance with the principles of the present invention. The window molding 10 is shown mounted on the upper portion of a motor vehicle door body 12, illustrated in broken-line configuration. In particular, the window molding 10 is mounted longitudinally along the belt-line of the vehicle door at the portion at which the outer door panel 14 and inner door panel 16 are joined. In the preferred embodiment, the window molding 10 generally includes a main body 11 and a cover trim member 60 as will be more fully described.

Figure 2:
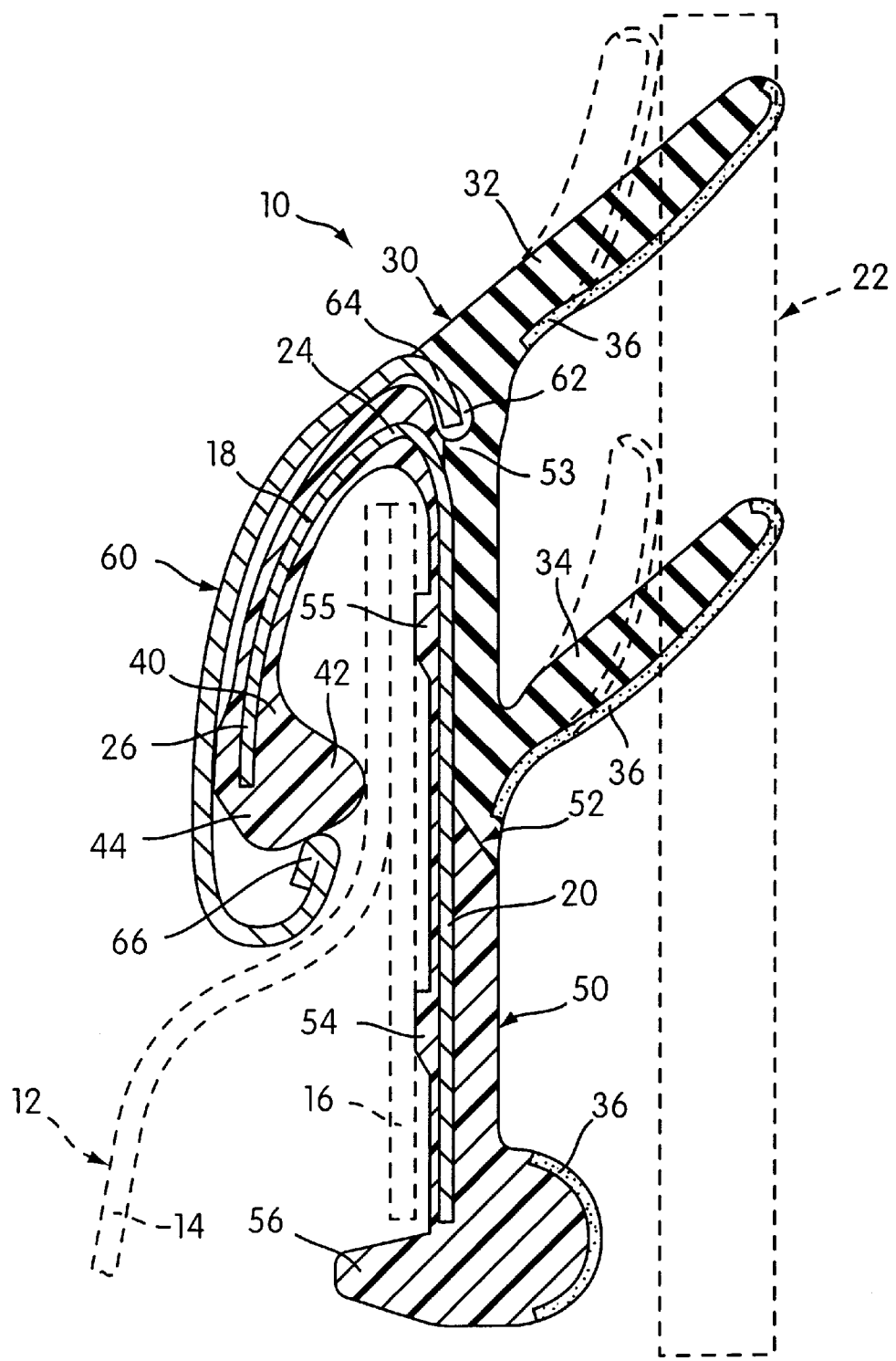
FIG. 2 is a cross-sectional view taken through the line 2—2 in FIG. 1.

FIG. 2 is a cross-sectional view taken through the line 2—2 in FIG. 1. As shown, the ain body 11 includes a seal member or seal structure 30, and a door mounting structure 50. he door mounting structure has rigid interior support structure 18, preferably made of aluminum. Steel, hardened plastic, or other rigid material can also be used. The support structure 18 includes a substantially flat plate portion 20, which is constructed and arranged to extend downwardly between the door body 12 and the vehicle window, which window is represented generally in broken-line configuration by reference numeral 22. The support structure 18 further includes an upper bent portion 24 extending from the plate portion 20 and is constructed and arranged to bend over the joint between the inner door panel 16 and outer door panel 14. The support structure 18 then extends downwardly from the bent portion 24 to flange portion 26 thereof. In essence, the support structure 18 has an inverted-J cross-sectional configuration.

Support structure 18 is imbedded along its entire extent within the seal or member 30 and the door mounting structure 50, as shown. The seal member 30 and door mounting structure 50 together form the main body 11 of the window molding 10. The upper part of plate portion 20 on the window facing side thereof, is covered by the seal member 30. The seal member 30 is preferably made from a flexible, resilient material, such as Sumprene, or the like. Seal member 30 preferably includes an upper seal portion 32 and a lower seal portion 34, which portions extend generally between the door body 12 and the window 22 to prevent external elements, such as rainwater, from entering between the door body 12 and window 22. The underside of the upper seal portion 32 and the underside of the lower seal portion 34 are provided with conventional dorrie flock material, indicated by reference numeral 36. The upper seal portion 32 and the lower seal portion 34 are constructed and arranged to flex and apply a resilient force against the window 22, as can be appreciated from the broken-line illustration of the upper seal portion 32 and lower seal portion 34. In particular, the upper seal portion 32 and the lower seal portion 34 force the dorrie flock material against the window, with the dorrie flock material providing a sliding friction seal, which permits sliding movement of the window, but prevents rainwater from seeping between the window 22 and door body 12.

The mounting structure 50 covers the rest of the support structure 18 which is not covered by seal member 30, and is preferably made from a rigid PVC material. The mounting structure 50 meets the seal member 30 at joints 52, 53 therebetween and is constructed and arranged to mount the entire molding 10 on the door body 12. The mounting structure 50 includes a flange portion 40, which surrounds the flange portion 26 of the support structure 18. The flange portion 40 includes an enlarged end portion 42, which is constructed and arranged to engage the exterior surface of the outer door panel 14. The portion of the mounting structure 50 adjacent the plate portion 20 and which faces away from the window 22, includes flanges 54 and 55, which are constructed and arranged to engage the exterior surface of the inner door panel 16. The mounting structure 50 further includes a lower projection 56, which is adapted to extend within an opening in the inner door panel 16. The flanges 54, 55, projection 56, and end portion 42 serve to mount the molding 10 on the door 12. In particular, in the configuration shown in FIG. 2, the flange portion 26 and plate portion 20 of the support structure 18 are moved slightly outwardly away from one another by slight outward flexing of bent portion 24 against the nature configuration thereof when the entire window molding 10 is slipped over the upper part of the door body 12. This causes the end portion 42 of the flange portion 40 and opposing flanges 54, 55 to apply a resilient force against the exterior surface of the door body 12 to thus pinch the upper portion of the door body 12 therebetween. When the molding is slid onto the door, the projection 56 rides down the upper portion of the inner door panel 16 until it reaches the door opening, at which point is resiliently "snapped" in place within the opening to secure the molding 10 to the door body 12. As can be appreciated from FIG. 1, the projection 56 does not extend the entire length of the molding, as neither does the opening in the inner panel 16 within which the projection 56 fits, as will be appreciated by those skilled in the art.

The mounting structure 50 is also provided with a dorrie flock material 36 at a lower portion thereof facing window 22 in the event that this portion is to engage the window 22, although this is not the case with the preferred embodiment shown. The flange portion 40 also includes a bottom ridge portion 44, which defines the lowermost extremity of the flange portion 40 when installed.

Preferably, the seal member 30, the mounting structure 50, the dorrie flocks 36, and the support structure 18 are extruded together in an in-line extrusion process. After these elements have been manufactured, a cover trim member 60 is snapped in place to cover the flange portion 40 of the mounting structure 50 for aesthetic and protective purposes.

Figure 3:
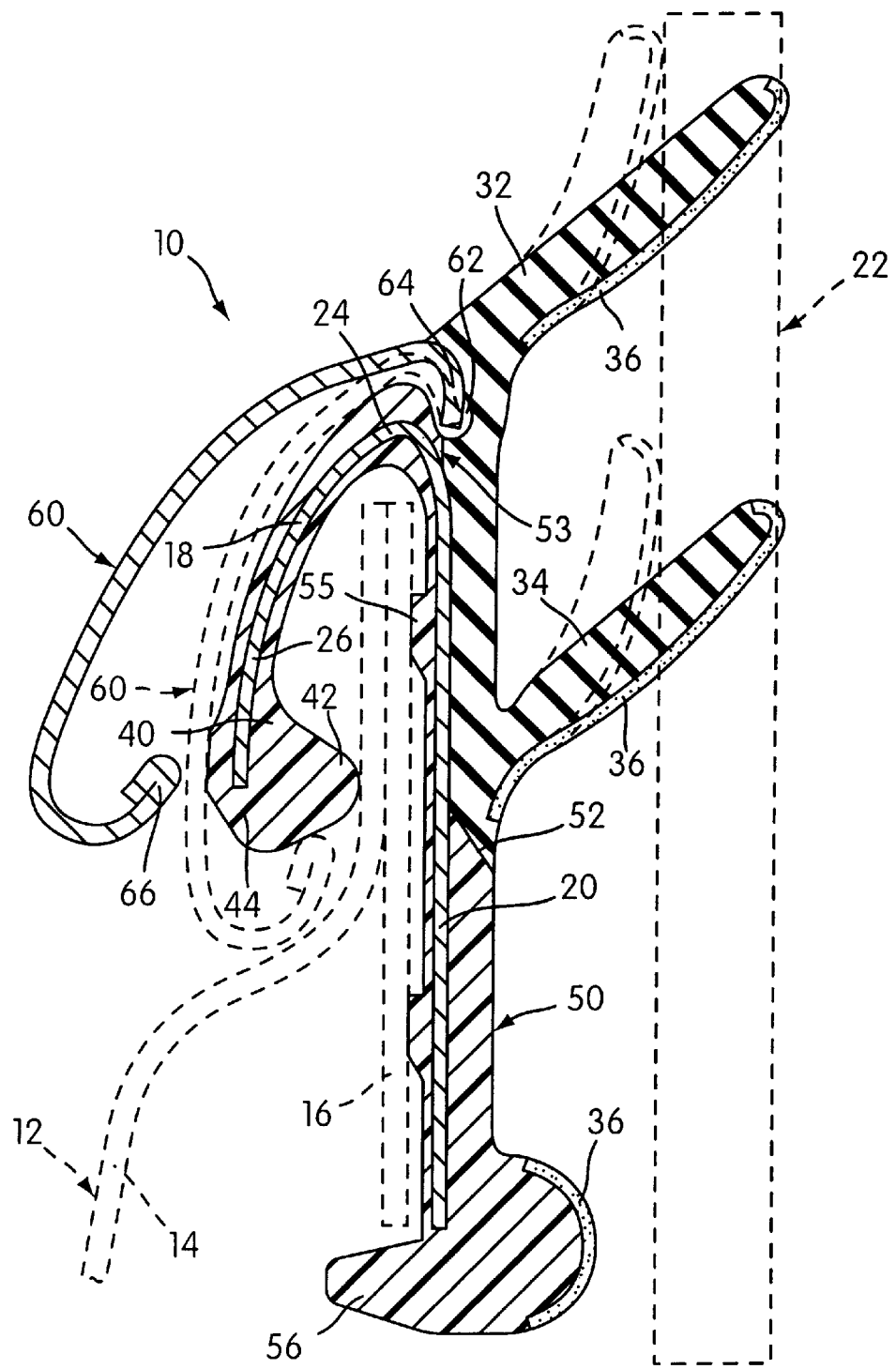
FIG. 3 is a cross-sectional view of the cover trim member in the process of being installed on the belt-line window molding in accordance with principles of the present invention.

The installation of the cover trim member 60 can be appreciated more fully from FIG. 3. Preferably, the cover trim member is secured to the rest of the molding as a final assembly step of manufacturing the molding before the molding 10 is installed on the door, although it is contemplated that it is possible to provide an arrangement wherein the cover trim member 60 is installed after the rest of the molding is installed on the door. As shown, an opening 62 is provided generally at the upper joint 53 between the seal member 30 and mounting structure 50. The cover trim member 60 has a generally C-shaped cross-sectional configuration. An upper lip 64 of this C-shaped configuration is constructed and arranged to be received within the opening 62. In the method of installation, the cover trim member 60 is pivoted about this upper lip 64 (in a counter-clockwise direction in FIG. 3) until a lower bent lip 66 engages the lower part of the flange portion 40. More particularly, the lower bent lip 66 of the cover trim member 60 engages the bottom ridge portion 44, and is forced to ride over the ridge portion 44 to snap-in place on the other side of the ridge portion 44, thus securing the cover trim member 60 in place. The movement of the cover trim member 60 over the ridge portion 44 may be effected by a slight outward flexing of the C-shaped cross-section of the cover trim member 60 and/or a slight inward compression or flexure of the flange portions 26, 40 towards the plate portion 20.

Because the cover trim member 60 is formed separately from the rest of the window molding 10, significant flexibility with respect to the particular requirements of the cover trim member 60 is accommodated. More particularly, for different applications, the cover trim member can be made of one of many different types of materials, such as aluminum or steel. In addition, it may be desirable to have the cover trim member 60 anodized or chrome-plated. Furthermore, it may be desirable to have the cover trim member painted or otherwise colored based upon the color of the vehicle body or other factors. Because the cover trim member 60 can be installed subsequent to the rest of the window molding, particular specifications for the cover trim member 60 need not be specified when the rest of the molding is manufactured Furthermore, in recent years the motor vehicle manufacturing business has recognized the great costs involved in maintaining large inventories of parts for use on the assembly line. Particularly with respect to parts supplied by other parts supplying entities, original equipment manufacturers are reluctant to assume the costs of the large inventories and are passing on to the part maker the costs involved in supplying sufficient parts to keep the assembly line running. Belt-line moldings often need to match the exterior finish of their vehicle. Modem motor vehicle styling requirements are such that there can be 17 or more different color exterior finishes that must be matched by the part maker of the belt-line molding for the vehicle. The present invention effectively deals with inventory cost problems in a cost-effective manner.

It thus will be seen that the objects of this invention have been fully and effectively accomplished. It will be understood, however, that the foregoing preferred specific embodiments have been shown and described for the purpose of this invention and is subject to change without departure from such principles. Therefore, this invention includes all modifications encompassed within the spirit and scope of the following claims.

What is claimed is:

1. A method of assembling a belt-line window molding for a motor vehicle door comprising i) a metal cover member having a of edges and a channel configuration and ii) a main body including a longitudinally extending edge receiving recess, a resilient window sealing structure constructed and arranged to seal a gap between the motor vehicle door and a motor vehicle window carried by said door, and a mounting structure constructed and arranged to mount the window molding on the motor vehicle door with a rigid portion of said mounting structure overlying an exterior surface of the door, said rigid portion having sufficient rigidity such that when one of said edges of said metal cover member is inserted into said edge receiving recess and then said cover member is pivoted generally about said one edge so as to engage an opposite one of said edges of said metal cover member with said rigid portion, applying a force to said cover member to move said opposite edge of said metal cover member in sliding relation across said rigid portion outwardly flexes said cover member, said method comprising:

forming said main body by extrusion;

placing said one edge of said metal cover member in said edge receiving recess of said main body;

pivoting said metal cover member generally about said one edge so as to engage said opposite edge of said metal cover member with said rigid portion of said mounting structure;

applying a force to said cover member to move said opposite edge of said metal cover member in sliding engagement across said rigid portion such that said metal cover member outwardly flexes to an extent sufficient to allow said opposite edge thereof to slide over said rigid portion and such that, after said opposite edge slides over said rigid portion, said cover member inwardly flexes back towards its original configuration and into gripping engagement with said rigid portion to secure said cover member to said main body.

2. The method according to claim 1, wherein said rigid portion of said mounting structure has a ridge portion formed thereon, and wherein applying said force to said cover member moves said opposite edge upwards one side of said ridge in sliding engagement with said one side of said ridge, and after said opposite edge slides over said ridge portion, said opposite edge rides downwards an opposite side of said ridge during the inward flexing of said cover member back towards its original configuration.

3. The method according to claim 1, wherein after said metal cover member is secured to said main body, said window molding is mounted on the motor vehicle door.

4. The method according to claim 3, wherein said mounting structure comprises an exterior portion constructed and arranged to be disposed exteriorly to an outer door panel, and an interior portion constructed and arranged to be disposed between an inner door panel and the motor vehicle window, and wherein said mounting step comprises:

moving said interior portion downwardly between said inner door panel and said motor vehicle window while in sliding engagement with a surface of said inner door panel;

moving said exterior portion downwardly over said outer door panel while in sliding engagement therewith;

outwardly flexing said mounting structure so that said interior portion and exterior portion move away from one another during said moving downwardly thereof;

inwardly flexing said mounting structure towards its original configuration as a projection of said mounting structure is received within an opening in said inner door panel;

said projection co-acting with an edge defining said opening in said inner door panel for prevent said molding from being pulled off said vehicle door.

5. The method according to claim 3, further comprising the step of treating said cover member after said forming of said main body by extrusion, and before said cover member is secured to said main body.

6. The method according to claim 5, wherein said treating comprises any one selected from a group consisting of anodizing, chrome plating, and painting.

7. A method for making a belt-line window molding for a motor vehicle door, said method comprising:

providing a metal cover member having a pair of edges and a channel configuration;

providing an extruded main body having (a) a longitudinally extending edge receiving recess, (b) a resilient window sealing structure constructed and arranged to seal a gap between the motor vehicle door and a motor vehicle window carried by the motor vehicle door, and (c) a mounting structure constructed and arranged to mount the window molding on the motor vehicle door with a rigid portion of said mounting structure overlying an exterior surface of the door, said rigid portion having sufficient rigidity such that when one of said edges of said metal cover member is inserted into said edge receiving recess and then said cover member is pivoted generally about said one edge so as to engage an opposite one of said edges of said metal cover member with said rigid portion, applying a force to said cover member to move said opposite one of said edges of said metal cover member in sliding relation across said rigid portion outwardly flexes the said cover member;

inserting said one edge of said metal cover member in the edge receiving recess of said main body;

pivoting said metal cover member generally about said one edge so as to engage said opposite edge of said metal cover member with said rigid portion of said mounting structure;

applying a force to said cover member to move said opposite edge of said metal cover member in sliding engagement across said rigid portion such that said metal cover member outwardly flexes to an extent sufficient to allow said opposite edge to slide over said rigid portion and such that, after said opposite edge slides over said rigid portion, said cover member inwardly flexes back towards its original configuration and into gripping engagement with said rigid portion to secure said cover member to said main body.

8. A method according to claim 7, further comprising extruding said main body.

* * * * *